US010625576B2

(12) United States Patent
Kuster et al.

(10) Patent No.: US 10,625,576 B2
(45) Date of Patent: Apr. 21, 2020

(54) GLAZING WITH INBUILT PROFILE SECTION

(71) Applicant: SAINT-GOBAIN GLASS FRANCE, Courbevoie (FR)

(72) Inventors: Hans-Werner Kuster, Aachen (DE); Volkmar Offermann, Eschweiler (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 147 days.

(21) Appl. No.: 15/778,135

(22) PCT Filed: Nov. 23, 2016

(86) PCT No.: PCT/FR2016/053058
§ 371 (c)(1),
(2) Date: May 22, 2018

(87) PCT Pub. No.: WO2017/089702
PCT Pub. Date: Jun. 1, 2017

(65) Prior Publication Data
US 2018/0345773 A1  Dec. 6, 2018

(30) Foreign Application Priority Data

Nov. 23, 2015 (FR) .................................. 15 61226

(51) Int. Cl.
*B60J 1/00* (2006.01)
*B60J 1/02* (2006.01)
(Continued)

(52) U.S. Cl.
CPC ......... *B60J 1/001* (2013.01); *B32B 17/10036* (2013.01); *B32B 17/10293* (2013.01);
(Continued)

(58) Field of Classification Search
CPC ........ B32B 17/10036; B32B 17/10293; B32B 17/10302; B60J 1/001; B60J 1/006; B60J 1/02
(Continued)

(56) References Cited

U.S. PATENT DOCUMENTS 3,745,309 A * 7/1973 Gruss ................ B32B 17/10036
219/522
4,906,271 A * 3/1990 D'Iribarne .......... C03B 23/0307
65/273

(Continued)

FOREIGN PATENT DOCUMENTS

DE    3606566 A1   9/1987
EP  0 945 296 A1   9/1999
(Continued)

OTHER PUBLICATIONS

International Search Report as issued in International Patent Application No. PCT/FR2016/053058, dated Mar. 2, 2017.

*Primary Examiner* — Jason S Morrow
(74) *Attorney, Agent, or Firm* — Pillsbury Winthrop Shaw Pittman LLP

(57) ABSTRACT

A glazing includes a laminated glazed element including an exterior glass sheet, an interior glass sheet, and at least one plastic interlayer sheet situated between the glass sheets, and, along at least part of at least one edge, a profile section including a functional part provided with a groove and a fixing part for fixing it to the glazed element. The fixing part includes an interlayer flange which, viewed in cross section, is situated between the interlayer face of the exterior glass sheet and the interlayer face of the interior glass sheet; of the interior face and the exterior face of the interlayer flange at least one face being in contact with the plastic interlayer sheet.

20 Claims, 5 Drawing Sheets

(51) Int. Cl.
   *B32B 17/10*   (2006.01)
   *B60J 10/18*   (2016.01)
   *B60J 10/70*   (2016.01)
   *B60J 10/30*   (2016.01)

(52) U.S. Cl.
   CPC ............. *B60J 1/02* (2013.01); *B32B 2250/03* (2013.01); *B32B 2250/40* (2013.01); *B32B 2315/08* (2013.01); *B32B 2329/06* (2013.01); *B32B 2605/006* (2013.01); *B60J 1/006* (2013.01); *B60J 10/18* (2016.02); *B60J 10/30* (2016.02); *B60J 10/70* (2016.02)

(58) Field of Classification Search
   USPC ............................................. 296/96.21, 84.1
   See application file for complete search history.

(56) References Cited

U.S. PATENT DOCUMENTS

| | | | | |
|---|---|---|---|---|
| 4,944,984 | A * | 7/1990 | Kunert | B60J 10/79 428/83 |
| 8,393,668 | B2 * | 3/2013 | Timmermann | B60J 10/35 296/84.1 |
| 8,449,016 | B2 * | 5/2013 | Timmermann | B60J 10/30 296/146.15 |
| 8,991,893 | B2 * | 3/2015 | Platt | B60J 10/32 296/93 |
| 9,259,994 | B2 * | 2/2016 | Erner | B60J 1/02 |
| 9,694,659 | B2 * | 7/2017 | Timmermann | B60J 10/30 |
| 2010/0227135 | A1 * | 9/2010 | Takagi | B32B 17/10018 428/215 |
| 2014/0367989 | A1 * | 12/2014 | Erner | B60J 1/02 296/84.1 |
| 2018/0029449 | A1 * | 2/2018 | Dalmasso | B60J 1/02 |
| 2018/0154752 | A1 * | 6/2018 | Trombetta | B60J 1/004 |
| 2019/0248122 | A1 * | 8/2019 | Gillessen | B32B 17/10036 |
| 2019/0255813 | A1 * | 8/2019 | Bauerle | B32B 17/10036 |
| 2019/0283550 | A1 * | 9/2019 | Notsu | B32B 3/263 |
| 2019/0299765 | A1 * | 10/2019 | Yajima | B60J 1/08 |

FOREIGN PATENT DOCUMENTS

| | | |
|---|---|---|
| EP | 1 859 931 A1 | 11/2007 |
| EP | 3 037 292 A1 | 6/2016 |
| FR | 2 967 117 A1 | 5/2012 |
| WO | WO 2001/045974 A1 | 6/2001 |
| WO | WO 2001/085481 A1 | 11/2001 |
| WO | WO 2004/011249 A1 | 2/2004 |
| WO | WO 2013/127977 A1 | 9/2013 |
| WO | WO 2016/124868 A1 | 8/2016 |

* cited by examiner

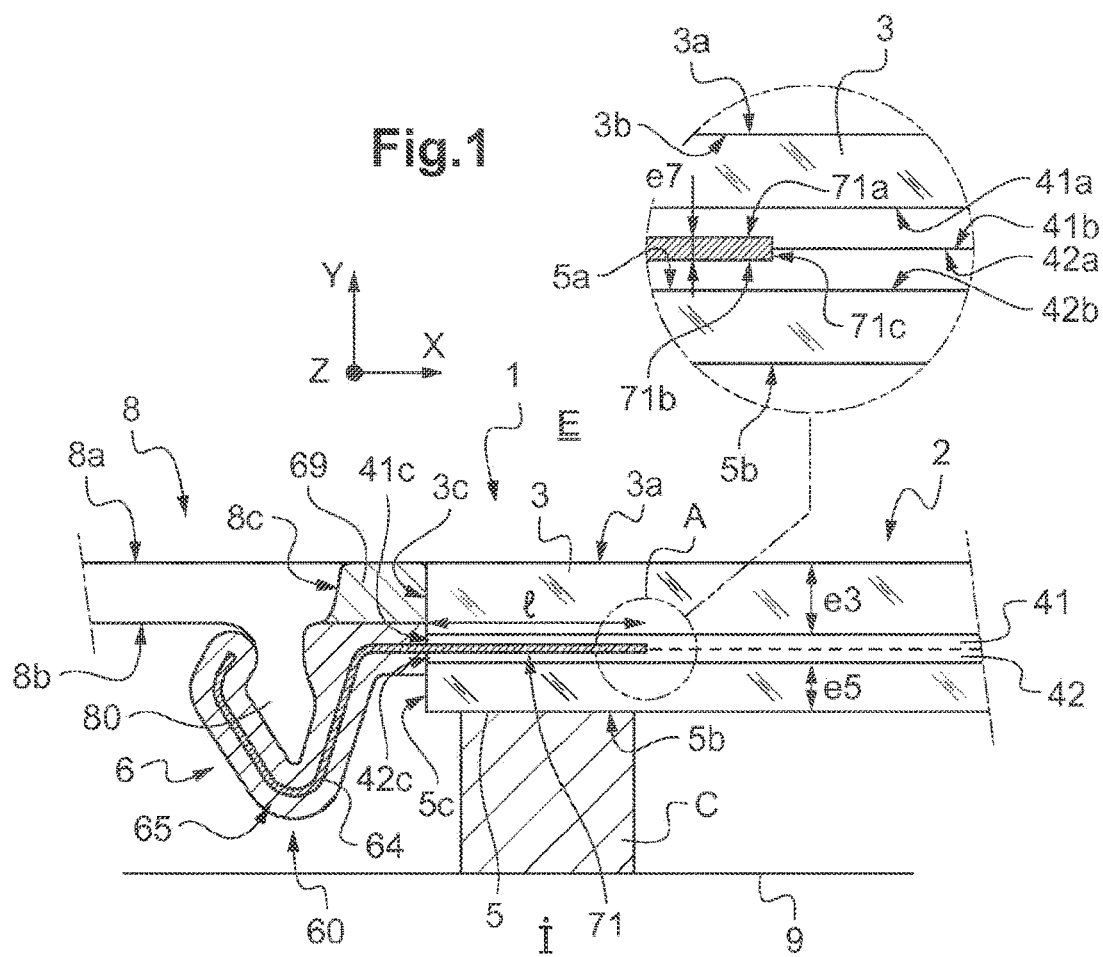
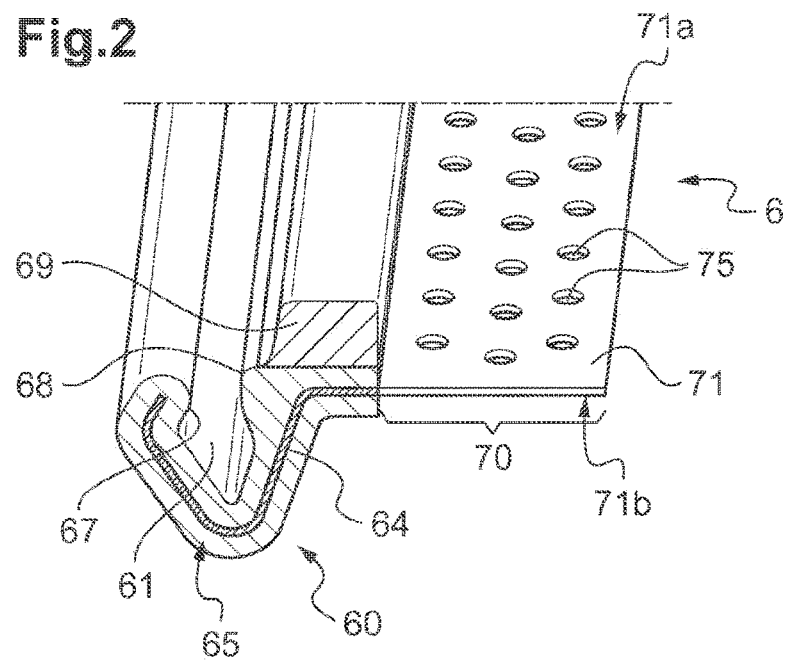

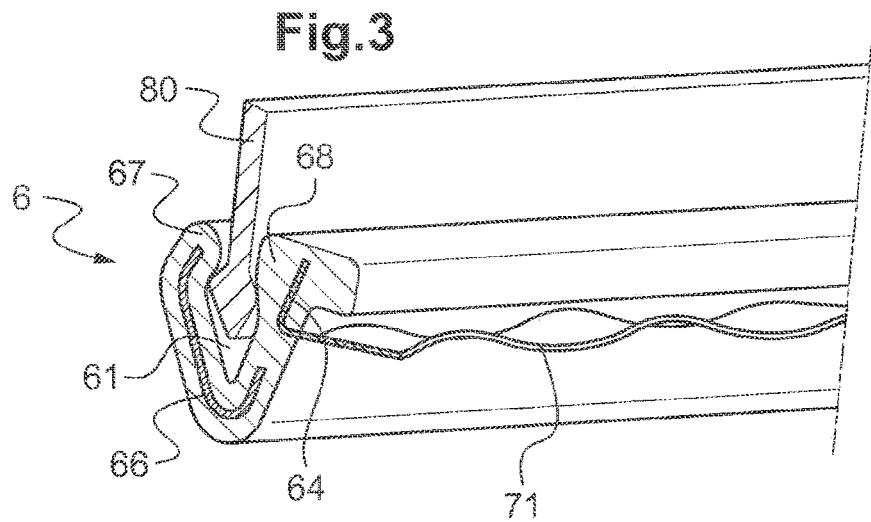
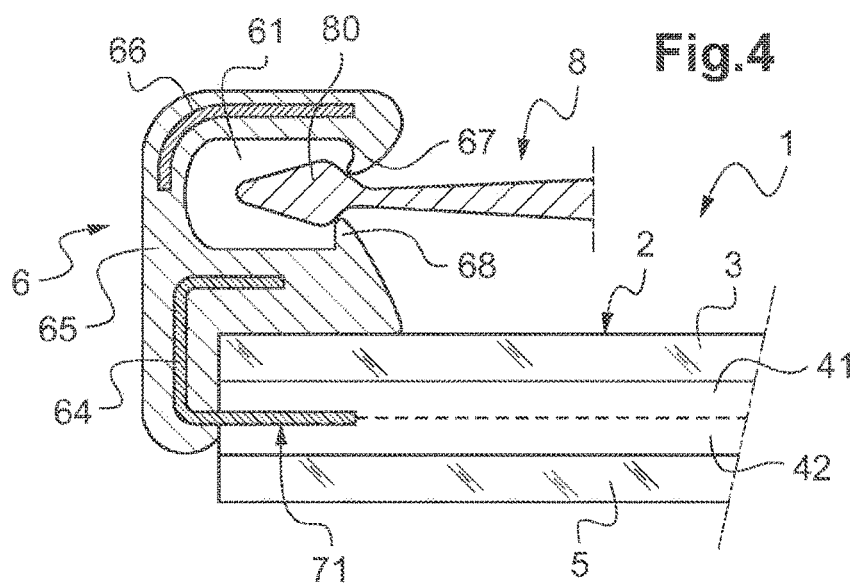
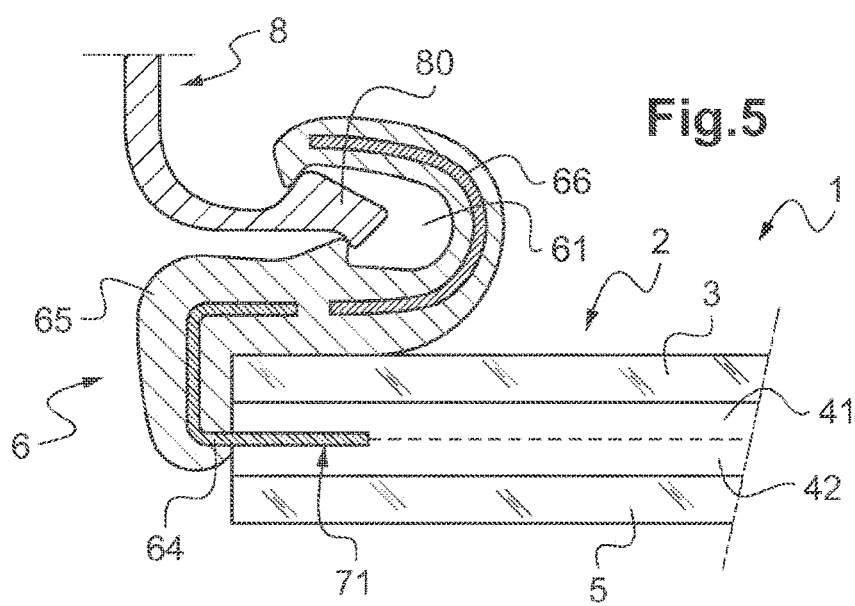

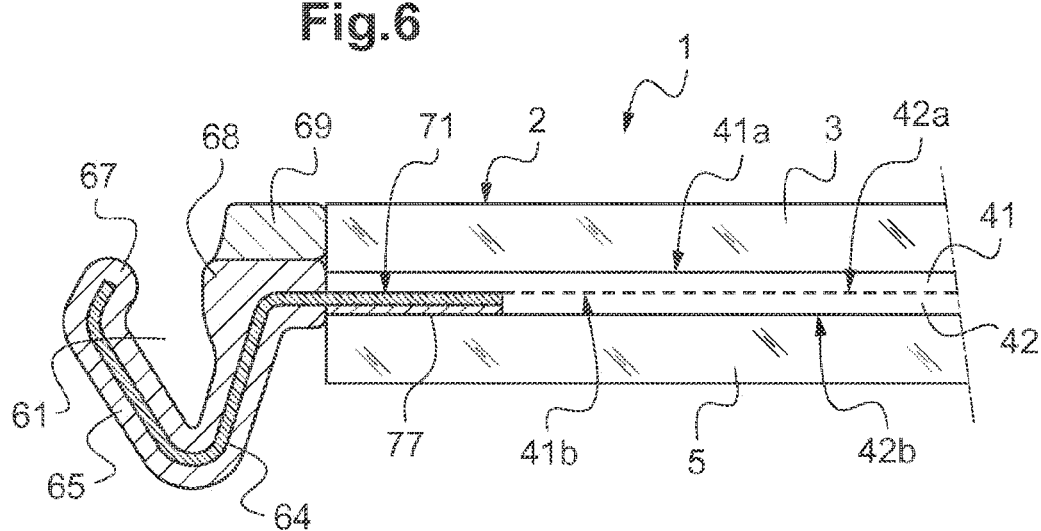
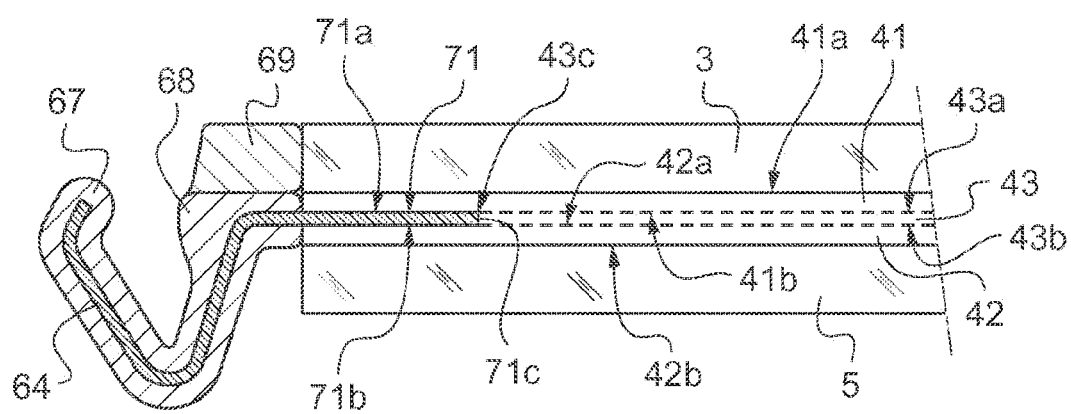

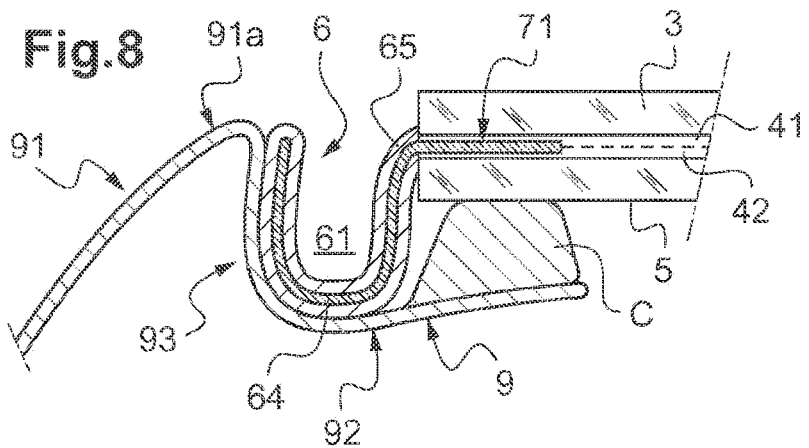
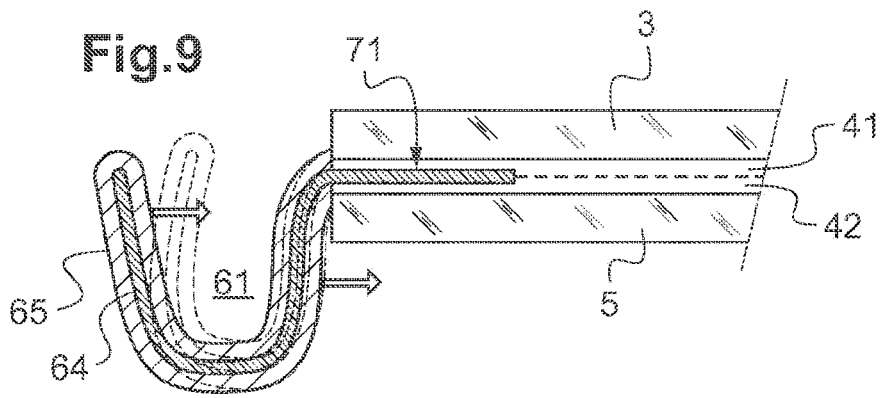
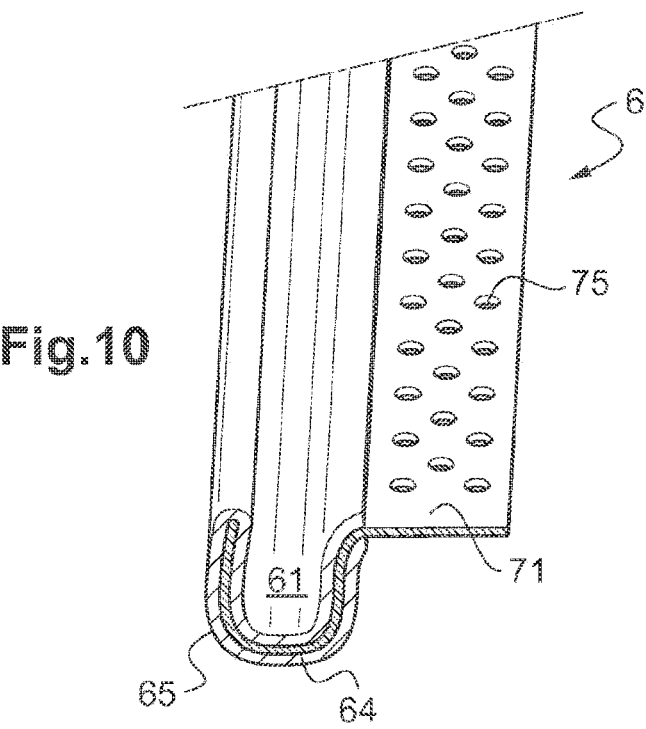

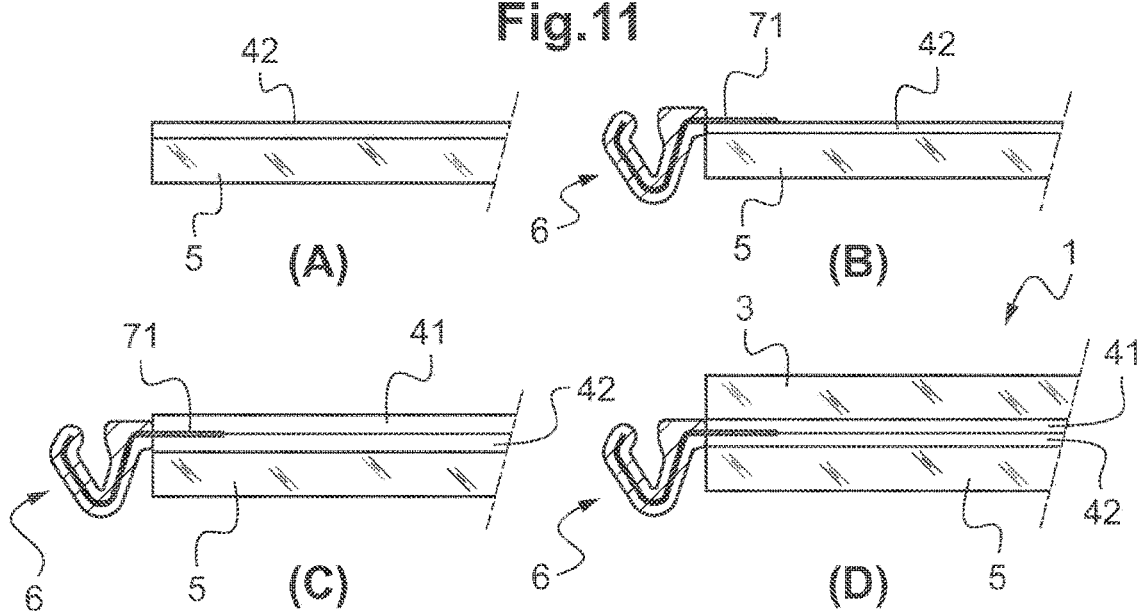
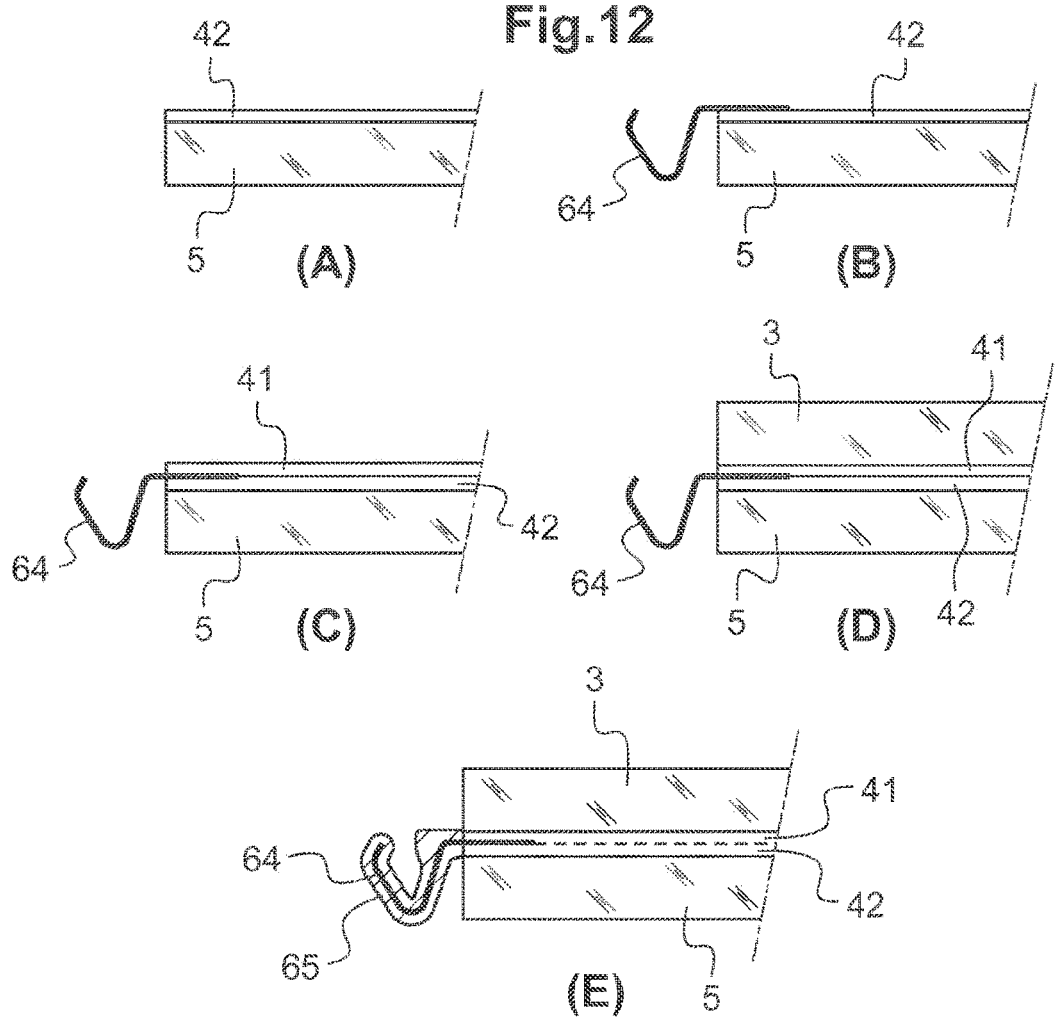

GLAZING WITH INBUILT PROFILE SECTION

CROSS-REFERENCE TO RELATED APPLICATIONS

This application is the U.S. National Stage of PCT/FR2016/053058, filed Nov. 23, 2016, which in turn claims priority to French patent application number 1561226 filed Nov. 23, 2015. The content of these applications are incorporated herein by reference in their entireties.

TECHNICAL FIELD

This description relates to a glazing, in particular a vehicle glazing.

It relates more specifically to a glazing of the type comprising a laminated glazed element comprising an exterior glass sheet, an interior glass sheet, and at least one plastic interlayer sheet situated between said glass sheets, said exterior glass sheet having an exterior face, an edge face and an interlayer face which faces toward said plastic interlayer sheet,
said interior glass sheet having an interlayer face which faces toward said plastic interlayer sheet, an edge face and an interior face, and
said glazing comprising, along at least part of at least one edge, a profile section comprising a functional part provided with a groove and a fixing part for fixing it to the glazed element.

BACKGROUND OF THE INVENTION

Vehicle glazings, and in particular windshields and rear screens, are commonly associated with systems for collecting or removing runoff water.

Thus glazings are known which, along at least part of at least one edge comprise a profile section comprising a groove which can be used for the clip-fastening of a cover piece, for example a scuttle panel, or even for recovering and removing runoff water.

Such a profile section is generally fixed to the interior face of the glazed element (or interior face of the interior glass sheet) using an interior flange which is bonded against this interior face.

For this interior flange to adhere firmly to the glazed element, this interior flange needs to be relatively wide (when the profile section is viewed in cross section).

The prior art recognizes two types of situation:
 where the cover piece covers at least the groove, protruding over the exterior face of the glazed element, such as, for example, in patent applications EP 945 296, DE 3606566; and
 where the cover piece covers at least the groove without protruding over the exterior face of the glazed element, such as, for example, in patent applications WO 2001/045974 or WO 2001/85481.

In the former situation, the cover piece needs to be wide enough to cover at least the interior flange so that it is not visible from the exterior and/or a masking strip is produced further toward the exterior than the interior flange.

In the latter situation, a masking strip is produced further toward the outside than the interior flange in order to cover at least the interior flange so that it is not visible from the exterior.

What these two situations have in common is that the cover piece and/or the masking strip are themselves or together at least as wide as the interior flange and generally wider than the interior flange, with the result that the unobstructed area for looking through the glazed element is reduced.

Furthermore, because of the presence of the interior flange at the corner between the edge face of the interior glass sheet and the interior face thereof, the bead of adhesive used to bond the glazing to the adjacent bodywork needs to be positioned further toward the center of the glazing; now, this bead of adhesive needs likewise to be hidden from the exterior.

It is therefore common practice to consider that there is a strip 30 to 35 mm wide along the edge of a glazing equipped with a grooved profile section that cannot be used to allow light through and which thus reduces the unobstructed area for looking through.

OBJECT AND SUMMARY OF THE INVENTION

One of the objectives of the present invention is to provide a glazing that overcomes the disadvantages of the prior art, incorporates a water-management profile section that is firmly attached to the glazed element, and that makes it possible to increase the unobstructed area for looking through the glazed element.

This objective is achieved with a glazing, in particular a vehicle glazing, comprising a laminated glazed element comprising an exterior glass sheet, an interior glass sheet, and at least one plastic interlayer sheet situated between said glass sheets,
said exterior glass sheet having an exterior face, an edge face and an interlayer face which faces toward said plastic interlayer sheet,
said interior glass sheet having an interlayer face which faces toward said plastic interlayer sheet, an edge face and an interior face, and
said glazing comprising, along at least part of at least one edge, a profile section comprising a functional part provided with a groove and a fixing part for fixing it to the glazed element,
the glazing being characterized in that the fixing part comprises an interlayer flange which, viewed in cross section, is situated between the interlayer face of said exterior glass sheet and the interlayer face of said interior glass sheet, said interlayer flange comprising an exterior face facing toward the exterior glass sheet, an interior face facing toward the interior glass sheet and an edge face, and
in that, of the interior face and the exterior face of the interlayer flange at least one face is in contact with said at least one plastic interlayer sheet.

According to the invention, the interlayer flange of the profile section is fixed to the glazed element via the plastic interlayer sheet(s).

Because the interlayer flange is laminated between the exterior and interior glass sheets of the glazed element, it is fixed far more firmly than if it were simply bonded to an internal face of the glazing. The fixing flange of the profile section can thus be less wide, and the unobstructed area for looking through the glazing increased. Moreover, the glazing according to the invention is easy to fit.

Viewed in cross section, the functional part of the profile section is hook-shaped. In certain applications of the invention, this shape allows rainwater to be caught and removed directly. The groove then acts as a discharge channel or gutter. In other applications, the groove is intended to collaborate with a cover piece which in particular has the function of managing runoff water, for example a scuttle panel.

In this description, a plastic interlayer sheet is to be understood to mean any sheet that allows the exterior glass sheet and the interior glass sheet to adhere to one another in such a way as to obtain a laminated glazing. Such a sheet is typically made of PU (polyurethane) or of PVB (polyvinyl butyral) or EVA (ethylene vinyl acetate copolymer).

Typically, the edge face of the interlayer flange is also in contact with said at least one plastic interlayer sheet.

According to one example, the exterior face of the interlayer flange and the edge face of the interlayer flange are in contact with said at least one plastic interlayer sheet and the interior face of the interlayer flange is connected, by contact or via the interposition of a layer of adhesive material, with the interlayer face of the interior glass sheet. By virtue of these provisions, the stresses applied to the profile section when the cover piece is being fixed to the groove are partially reacted by the interior glass sheet. The plastic interlayer sheet therefore experiences less stress, and the fixing of the interlayer flange to the glazed element is preserved.

According to one example, the glazed element comprises at least one exterior interlayer sheet and one interior interlayer sheet made of plastic between the exterior glass sheet and the interior glass sheet, the exterior face of the interlayer flange being in contact with the exterior interlayer sheet and the interior face of the interlayer flange being in contact with the interior interlayer sheet.

According to one example, the glazed element further comprises a third plastic interlayer sheet between the exterior interlayer sheet and the inferior interlayer sheet, the edge face of the interlayer flange being in contact with the edge face of said third interlayer sheet.

The glazings according to the invention are generally intended to mark the separation between an exterior space E and an interior space I, of a vehicle for example. The ideas of "exterior" and "interior" are therefore considered respectively with respect to this exterior space E and this interior space I.

For the purposes of this description a main direction orthogonal to the tangent to the exterior face of the exterior glass sheet of the glazed element at the point where said exterior face and the edge face of said sheet meet is also defined in any transverse plane of the glazing.

A lateral direction orthogonal to said main direction, in the same transverse plane, is defined.

In the context of the present description, the adjectives "distal" and "proximal" are used to define portions of a profile section. It will particularly be considered that, in a transverse plane, a distal part of the profile section is further away (or intended to be further away) from the glazed element (generally in a direction orthogonal to the direction of opening of the groove) than a proximal part of the same profile section.

According to one example, the groove has its opening facing in the main direction. The groove may also have its opening facing in the lateral direction.

According to one example, the groove is open toward the exterior.

According to one example, the profile section has, in cross section, two recesses that are open in the same direction or in opposite directions, a first recess forming the groove and a second recess fitting over the exterior glass sheet.

The profile section may thus, in cross section, have an m-shape or an S-shape.

According to one example, the interlayer flange has a width (measured in the lateral direction) comprised between 5 and 40 mm, in particular between 5 and 20 mm.

In order to avoid delamination caused by expansion thereof, the interlayer flange may possibly be corrugated. In particular, the interlayer flange may have corrugations, viewed in a longitudinal plane orthogonal to the lateral direction. In an alternative form, it may also have corrugations viewed in a transverse plane.

According to one example, the profile section comprises at least one body part made of a thermoplastic material delimiting the groove, and at least one fixing insert provided with a distal part inserted into said body part and with a proximal part that projects out of said body part.

In this case, the interlayer flange may be made up at least in part of said proximal part of the fixing insert.

The fixing insert is, for example, made from a metallic material. More generally, the fixing insert is made from a material that has a coefficient of expansion substantially identical to that of glass.

In order to improve the fixing of the profile section to the glazed element, the interlayer flange may have at least one cavity, particularly at least one through-opening. According to one arrangement, the cavity extends in the main direction. At the time of manufacture, the plastic of which the at least one interlayer sheet is made enters said cavity, improving the pullout strength of the fixing when subjected to a pullout force in the lateral direction.

For preference, the interlayer flange has a plurality of cavities, particularly through-openings, distributed evenly or unevenly over the entirety of its surface.

According to one example, the profile section extends all along at least one edge of the glazed element.

According to one example, the profile section is situated along two lateral edges of the glazed element and/or along an upper edge of the glazed element.

According to one example, the profile section is situated along a lower edge of the glazed element.

According to one example, the profile section is provided with a sealing lip between the groove and the interlayer flange.

Typically, the sealing lip is in contact with the edge face of the exterior glass sheet.

According to one example, the groove is configured for clip-fastening a cover piece onto said profile section.

The present description also relates to an assembly, comprising
 a glazing as defined hereinabove, in which the groove is configured for the clip-fastening of a cover piece onto said profile section, and
 a cover piece comprising, viewed in cross section, a barbed hook that enters the groove during clip-fastening.

The cover piece is, for example, a scuttle panel or a trim element.

The present description also relates to an assembly comprising
 a glazing as defined hereinabove, and
 a bodywork component,
the profile section bearing against said bodywork component.

According to one example, the bodywork component has a main portion and an end portion that is set back toward the interior with respect to said main portion and connected thereto by a shoulder, and the functional part of the profile section bears against the shoulder, and the glazed element is fixed by bonding to said end portion.

According to one particular arrangement, the functional part of the profile section is elastically deformed against the bodywork component so as to ensure sealed contact with said component.

According to a preferred arrangement, the functional part of the profile section conforms to the shape of the bodywork component.

The present description also relates to a profile section for a glazing as defined hereinabove, comprising at least one body part made of a thermoplastic material delimiting a groove, and at least one fixing insert provided with a distal part inserted into said body part and with a proximal part that projects out of said body part.

Such a profile section is, for example, produced by overmolding the fixing insert with the body part. It could also be produced by extrusion, in particular in the case of rectilinear profile sections of constant cross section.

The fixing insert is typically made from a metallic material.

According to one example, the body part is further reinforced by at least one reinforcing insert that is distinct from the fixing insert.

According to one example, the fixing insert extends substantially along the entire internal contour of the groove as viewed in cross section. In other words, the fixing insert extends continuously over at least 80% of the internal contour of the groove.

According to one example, the interlayer flange has a plurality of cavities, and particularly of through-openings.

The present description also relates to a method for producing a glazing as defined hereinabove, comprising a step of laminating the exterior glass sheet and the interior glass sheet of the glazed element using at least one plastic interlayer sheet, the lamination step involving placing the interlayer flange of the profile section between the exterior glass sheet and the interior glass sheet in contact with said at least one interlayer sheet.

It will be appreciated that the profile section is incorporated into the glazing at the moment of lamination.

Typically, the interlayer flange of the profile section is superposed with either the interior glass sheet or the exterior glass sheet in order to form a first stack, before the other of the glass sheets is placed on said first stack.

According to one particular embodiment example, the lamination step comprises the following sub-steps:
a1) a first plastic interlayer sheet is placed on a first glass sheet,
b1) the interlayer flange is superposed with said first interlayer sheet, the first glass sheet, the first interlayer sheet and the interlayer flange forming a first stack,
c1) a second glass sheet is placed on the first stack, the interlayer flange thus being arranged between the first and second glass sheets and fixed to said glass sheets via the first interlayer sheet.

According to one example, prior to sub-step c1) at least one second plastic interlayer sheet is placed on the second glass sheet or on the first stack, the interlayer flange thus being arranged, at the end of sub-step c1), between the first and second interlayer sheets.

According to another particular embodiment example, the lamination step comprises the following sub-steps:
a2) the interlayer flange is superposed with a first glass sheet, the first glass sheet and the interlayer flange forming a first stack,
b2) at least one plastic interlayer sheet and one second glass sheet are placed on the first stack, the interlayer flange thus being arranged between the first and second glass sheets and fixed to said glass sheets via the interlayer sheet.

According to one example, during sub-step a2), the interlayer flange is fixed to the first glass sheet using a layer of adhesive material.

According to one example, the interlayer flange is formed by a proximal part of an insert, so that after the lamination step, a distal part of the insert projects out of the laminated glazed element, and the method further comprises, following the lamination step, a step of coating said distal part of the insert that projects out of the laminated glazed element, in particular using overmolding.

Various embodiment or production examples are described in this description. However, unless specified otherwise, the features described in relation to one embodiment or production example may be applied to any other production or embodiment example.

BRIEF DESCRIPTION OF THE DRAWINGS

The invention will be clearly understood and the advantages thereof will become better apparent from reading the following detailed description of a number of embodiments which have been depicted by way of non-limiting examples. The description refers to the appended drawings, in which:

FIG. 1 illustrates a glazing according to a first embodiment, in cross section;

FIG. 1A is an enlarged view of detail A of FIG. 1;

FIG. 2 illustrates an alternative form of embodiment of the profile section of FIG. 1;

FIG. 3 illustrates an alternative form of embodiment of the profile section of FIG. 1;

FIG. 4 is a cross section of a glazing according to a second embodiment;

FIG. 5 is a cross section of a glazing according to a third embodiment;

FIG. 6 is a cross section of a glazing according to a fourth embodiment;

FIG. 7 is a cross section of a glazing according to a fifth embodiment;

FIG. 8 is a cross section of a glazing according to a sixth embodiment;

FIG. 9 is a cross section of an unassembled glazing according to the sixth embodiment;

FIG. 10 illustrates an alternative form of the sixth embodiment of the invention;

FIG. 11 illustrates various steps in the manufacture of the glazing of FIG. 1, according to one possible implementation;

FIG. 12 illustrates another possible implementation.

DETAILED DESCRIPTION OF EMBODIMENT EXAMPLES

The present invention relates to a glazing of the type comprising a laminated glazed element comprising an exterior glass sheet, an interior glass sheet and at least one plastic interlayer sheet situated between said glass sheets.

By way of example, examples of glazings according to the invention will be described hereinafter with reference to the attached drawings, in the context of applications as vehicle glazings, these glazings marking the separation between an exterior space E which is exterior to the vehicle and an interior space I which is interior to the vehicle.

In the example of FIG. 1, the invention is applied to a vehicle windshield and more particularly to a lower edge of a vehicle windshield. FIG. 1 is a view in cross section of the glazing 1 installed in a bodywork opening and intended to close said opening. One edge of this opening is illustrated in FIG. 1 as a rabbet 9.

In the example, the glazing 1 comprises a laminated glazed element 2 comprising an exterior glass sheet 3, an interior glass sheet 5 and two plastic interlayer sheets 41, 42 which are situated between said two glass sheets 3, 5.

The exterior glass sheet 3 has an exterior face 3a which faces toward the exterior E, an interlayer face 3b which faces toward the plastic interlayer sheets 41, 42, and an edge face 3c situated between these two faces. It has, for example, a thickness e3 comprised between 1.8 and 2.5 millimeters.

The interior glass sheet 5 has an interlayer face 5a which faces toward the plastic interlayer sheets 4, 4', an interior face 5b which faces toward the interior I and an edge face 5c situated between these two faces. It has, for example, a thickness e5 comprised between 1.2 and 2.5 millimeters.

The exterior interlayer sheet 41 has an exterior face 41a which faces toward the interlayer face 3b of the exterior glass sheet 3 and which in this instance is in contact with this interlayer face 3b, an interior face 41b which faces toward the interlayer face 5a of the interior glass sheet 5, and an edge face 41c.

The interior interlayer sheet 42 has an exterior face 42a which faces toward the interlayer face 3b of the exterior glass sheet 3, an interior face 42b which faces toward the interlayer face 5a of the interior glass sheet 5 and which in this instance is in contact with this interlayer face 5a, and an edge face 41c.

In the example, the two interlayer sheets 41, 42 both have the same thickness (for example 0.36 mm or even 0.72 mm). In an alternative form, they could also have different thicknesses.

They are for example made of PVB.

The glazed element 2 thus has an exterior face produced by the exterior face 3a of the exterior glass sheet 3, an interior face produced by the interior face 5a of the interior glass sheet 5 and an edge face situated between these two faces and corresponding to the edge face 3c of the exterior glass sheet 3, to the edge face 5c of the interior glass sheet 5 and to the edge faces 41c, 42c of the two plastic interlayer sheets, these edge faces in this instance being in the continuation of one another.

The glazing 1 is intended to be bonded to the bodywork rabbet 9 using a bead of adhesive C which is situated between the interior face 5b of the interior glass sheet 5 and an adjacent part of the rabbet 9.

The glazing 1 comprises, in addition to the glazed element 2, along at least part of the (in this case lower) edge thereof, a profile section 6, which, viewed in cross section, has a functional part 60 provided with a receiving housing or groove 61 in this instance intended for the clip-fastening of a cover piece 8 onto said profile section 6, and a fixing part 70 for fixing it to the glazed element and comprising an interlayer flange 71 situated between the interlayer face 3b of the exterior glass sheet 3 and the interlayer face 5a of the interior glass sheet 5.

In the cross section that is FIG. 1, a main direction Y orthogonal to the tangent to the exterior face 3a of the exterior glass sheet 3 of the glazed element 2 at the point at which said exterior face 3a and the edge face 3c of said sheet 3 meet is defined.

A lateral direction X, orthogonal to said main direction Y, is also defined.

The direction orthogonal to the aforementioned directions X and Y is referred to as the longitudinal direction Z.

In the example, the profile section 6 is a composite element comprising a fixing core or insert 64, in this instance made of metal, and a body part 65 made of thermoplastic surrounding part of said fixing insert.

The thermoplastic body part 65 is, for example, over-molded around the fixing insert 64.

It could also be extruded around the fixing insert 64, in the case of two-dimensional components (of constant cross section).

As will be described in greater detail in what follows, it could be monolithic (i.e. with no interface within the material), or made up of several sub-parts (connected by one or more interfaces), in particular sub-parts made of different materials.

The functional part 60 of the profile section 6 in this instance consists of the thermoplastic body part 65 delimiting the groove 61, a distal part of the fixing insert 64 being inserted into said body part 65 to secure it to said body part 65. In the particular example of FIG. 1, the distal part of the fixing insert 64 has a curved shape more or less corresponding to the profile of the groove 61.

According to an alternative form, the distal part of the fixing insert 64 may extend over a limited portion of the body part 65, which may potentially be stiffened by one or more other reinforcing insert(s).

A proximal part of the insert projects out of the body part.

It is this proximal part of the insert 64 that in this instance forms the interlayer flange 71 of the profile section.

The interlayer flange 71 comprises an exterior face 71a facing toward the exterior glass sheet 3, an interior face 71b facing toward the interior glass sheet 5 and an edge face 71c situated between these two faces.

In the example illustrated in FIG. 1 more particularly, the interlayer flange 71 is arranged between the two plastic interlayer sheets 41, 42.

The exterior face 71a of the interlayer flange 71 is in contact with the interior face 41b of the exterior interlayer sheet 41 and the interior face 71b of the interlayer flange 71 is in contact with the exterior face 42a of the interior interlayer sheet 42.

The edge face 71c of the interlayer flange 71 is in contact with one, the other or both of the two interlayer sheets 41, 42. It is this last scenario that is illustrated in FIG. 1 and visible more clearly in the detail of FIG. 1A.

The interlayer flange 71 has a thickness e7 that is less than the sum of the thicknesses of the two plastic interlayer sheets 41, 42. Thus it does not come into contact with the interlayer faces of the exterior and interior glass sheets 3, 5.

The interlayer flange 71 has a width 1, measured in the lateral direction X, comprised between 5 and 40 mm, or even comprised between 5 and 20 mm. This width is enough to ensure firm retention of the interlayer flange 71 between the exterior interlayer sheet 41 and the interior interlayer sheet 42 without the risk of disrupting the cohesion of the two glass sheets 41, 42.

For preference, the profile section 6 extends continuously over the entire length (or substantially the entire length) of the lower edge of the glazing 1.

In the example, the groove 61 is open toward the exterior.

The cover piece 8 here is intended to be positioned further toward the outside than the profile section 6 and to cover it at least in part when the glazing 1 is viewed from the exterior E. Here, in the context of the application to the lower edge of a windshield, this is a scuttle panel intended to make the visual connection between the windshield and the hood while at the same time channeling runoff water and at the same time providing ventilation of the engine compartment through the ventilation openings (not depicted). A scuttle panel is typically made of a plastic material. As an alternative, in particular in the context of an application to a windshield lateral or upper edge, the cover piece could equally be a trim element intended to limit the ingress of water along the side of the glazing through the presence of a lip situated against the rabbet 9.

In the example, the exterior face 8*a* of the scuttle panel, which is substantially planar, is intended to remove runoff water, in particular rainwater running off the windshield, and an opposite interior face 8*b* is provided with a barbed hook 80 intended to enter the groove 61 of the profile section 6 during clip-fastening.

The groove 61 has a mouth and a bottom: when the cover piece 8 is being clip-fastened, the barbed hook 80 enters the groove 61 via the mouth heading toward the bottom; in general, in the clip-fastened position, the barbed hook 80 does not touch the bottom of the groove.

The mouth of the groove, via which the barbed hook 80 is introduced, is produced by two throats: a distal throat 67, situated to the left of the barbed hook 80 in FIG. 1, and a proximal throat 68, situated to the right of the barbed hook 80 in the same figure. These two throats have the purpose of guiding the barbed hook 80 precisely toward the bottom of the groove 60 during clip-fastening.

The two throats 67, 68 of the mouth of the groove 61 are each hammer-shaped with their heads almost facing one another.

The barbed hook 80 for its part is a double barbed hook: it is made up, when viewed in cross section, of two bosses facing away from one another.

Clip-fastening thus consists in the barbed hook 80 entering the groove 61 and more specifically of the two bosses of the barbed hook entering the groove 61 and under the two throats.

For correct retention, the width of the mouth, at the shortest distance between the two throats 67, 68, is less than the width of the two bosses at their widest.

In this first embodiment, as illustrated in FIG. 1, the groove 61 does not extend beyond an artificial plane situated in the continuation of the exterior surface 3*a* of the exterior glass sheet 3: the profile section lies flush with the exterior surface 3*a* of the exterior glass sheet 3.

The distal exterior edge of the functional part 60 (on the side of the groove 61 that is furthest away from the glazed element 2 in FIG. 1) is situated less on the outside than the proximal exterior edge of said part 60 (on the side of the groove 61 that is closest to the glazed element 2 in FIG. 1) so that when the cover piece 8 is clipped into the groove 61 an exterior face 8*a* of the cover piece 8 can be in the continuation of the exterior surface 3*a* of the exterior glass sheet 3; the cover piece is then said to be "flush" with the exterior glass sheet 3. The profile section 6 does not protrude any further toward the exterior than the exterior face 3*a* of the exterior glass sheet 3.

It is thus also possible for the cover piece 8 to be present over the groove 61 but not to protrude over the exterior face 3*a*.

The bottom of the groove 61 may itself be situated further toward the interior than the interior face 5*b*; that does not impede the positioning of the glazing in the bodywork opening because there is space between the interior face 5*b* and the rabbet 9 for the bead of adhesive C.

The profile section 6 is thus laminated between the two glass sheets 3, 5 of the glazed element and fixed to these sheets 3, 5 via plastic sheets 41, 42 also known as "lamination interlayers". These plastic sheets 41, 42 here serve to fix the glass sheets 3, 5 together and to fix the profile section 6 to the glazed element 2.

The profile section 6 is therefore, at least in part, built into the glazed element 2 at the time of lamination.

FIG. 11 illustrates various steps in the production of the glazing 1 of FIG. 1, according to one possible embodiment.

In a first step (A), the interior interlayer sheet 42 is placed on the interlayer face 5*a* of the interior glass sheet 5.

In a second step (B), the profile section 6 is placed in such a way that the interlayer flange 71 is superposed with said interior interlayer sheet 42.

At that moment, the interior glass sheet 5, the interior interlayer sheet 42 and the interlayer flange 71 form a first stack.

In a third step (C), the upper interlayer sheet 41 is placed on the first stack.

In a fourth step (D), the exterior glass sheet 3 is placed on the upper interlayer sheet 41.

The interlayer flange 71 is thus placed between the exterior glass sheet 3 and the interior glass sheet 5 and fixed to said glass sheets 3, 5 via the plastic interlayer sheets 41, 42.

There is then applied to the assembly a pressure that is high enough to cause the various layers to adhere to one another by means of the plastic interlayer sheets 41, 42, in a vacuum bag, between lamination rolls (when the profile section 6 does not extend beyond the continuation of the exterior and interior faces 3*a*, 5*b* of the glazed element 2), or alternatively in an autoclave.

In the example illustrated, the profile section 6 is formed with its thermoplastic body part 65 prior to the lamination step.

According to an alternative form of embodiment, the body part 65 may also be formed around the distal part of the fixing insert 64 projecting out of the glazed element 2, after lamination. According to one possible embodiment, steps A to D may be identical to those described hereinabove but succeeded by a step E of coating the distal part of the fixing insert 64 that projects out of the glazed element 2, as illustrated in FIG. 12. The coating step E is, for example, a step involving overmolding at least a portion of the distal part of the insert 64 with the thermoplastic body part 65. This embodiment offers the advantage that, in the case of the body part 65, it allows the use of materials that are incompatible with the lamination step, for example of materials that are unable to withstand the high temperatures or pressures.

According to another alternative form, the stacking could be begun not on the interlayer face 5*a* of the interior glass sheet 5 but on the interlayer face 3*b* of the exterior glass sheet 3.

It might also be possible to preassemble at least one of the glass sheets with an interlayer sheet made of plastic. In the example of FIG. 11 for example, it might be possible to preassemble the plastic interlayer sheet 41 and the exterior glass sheet 3 before arranging this preassembled assembly on the first stack.

FIG. 2 illustrates an alternative form of profile section 6 that could be used in a glazing according to the invention, in which the interlayer flange 71 formed by the proximal part of the fixing insert 64 has a plurality of through-openings 75, in this instance distributed evenly over its surface. These openings open both onto the exterior face 71*a* and onto the interior face 71*b* of the interlayer flange 71.

According to an alternative form, the interlayer flange 71 may have one or more blind cavities, opening onto just one of its faces that are its exterior face 71a and its interior face 71b.

During assembly, under the effect of the pressure, the plastic constituting the interlayer sheet(s) 41, 42 enters the cavities of the interlayer flange 71, strengthening the fixing of the profile section 6 to the glazed element 2.

FIG. 3 illustrates yet another alternative form of profile section 6 that can be used in a glazing according to the invention, in which the interlayer flange 71 is corrugated.

In the example illustrated, the interlayer flange 71 has a wavy shape in longitudinal section (i.e. in a plane orthogonal to the axis X containing Y and Z).

According to an alternative form, it could have a wavy shape in cross section.

FIG. 4 illustrates a glazing 1 according to another embodiment, in which the groove is open in the lateral direction.

The profile section 6 has, in cross section, an m-shape. A first recess of the m creates the groove 61 to accommodate the barbed hook 80 of the cover piece 8 and a second recess of the m fits over the exterior glass sheet 3, preferably coming up against the edge face 3c of the exterior glass sheet 3.

FIG. 5 illustrates a glazing 1 according to another embodiment, in which the groove is open in the lateral direction.

The profile section strip 6 here has, in cross section, an S-shape. A first recess of the S (the upper recess, open to the left in FIG. 5) creates the groove 61 to accommodate the barbed hook 80 of the cover piece 8 and a second recess of the S fits over the exterior glass sheet 3, preferably coming up against the edge face 3c of the exterior glass sheet 3.

FIG. 6 illustrates a glazing 1 according to another embodiment of the invention in which the exterior face 71a and the edge face 71c of the interlayer flange 71 are in contact with the plastic interlayer sheets 41, 42. More specifically, in the example illustrated, the exterior face 71a of the interlayer flange 71 is in contact with the upper interlayer sheet 41 and its edge face 71c with the lower interlayer sheet 42.

The interior face 71b of the interlayer flange 71 is connected via a layer of adhesive material 77 to the interlayer face 5a of the interior glass sheet 5.

Thanks to these measures, the load supplied to the interlayer flange during clip-fastening of the cover piece 8 onto the groove 61 are reacted in part by the interior glass sheet. The interior plastic interlayer sheet 42 experiences less stress, and the fixing of the interlayer flange 71 to the glazed element 2 is preserved.

According to another embodiment which has not been depicted, the glazed element 2 could also comprise a single plastic interlayer sheet which would then be in contact with the exterior face of the interlayer flange of the profile section 6 and preferably the edge face 71c of this flange 71.

FIG. 7 illustrates a glazing 1 according to another embodiment of the invention, in which the glazed element 2 comprises, between the exterior interlayer sheet 41 and the interior interlayer sheet 42 made of plastic, a (third) plastic intermediate interlayer sheet 43.

The exterior face 71a of the interlayer flange 71 is in contact with the interior face 41b of the exterior interlayer sheet 41, the interior face 71b of the interlayer flange 71 is in contact with the exterior face 42a of the interior interlayer sheet 42 and the edge face 71c of the interlayer flange 71 is in contact with the edge face 43c of said intermediate interlayer sheet 43.

FIG. 8 illustrates a glazing 1 according to another embodiment of the invention, in particular a rear screen, assembled on a vehicle bodywork component.

In this example, the groove 61 of the profile section 6 of the glazing 1 is not intended for the clip-fastening of a cover piece 8 but is intended to form a flow channel, in particular in which runoff water can flow.

In the example illustrated it has a U-shaped cross section but could have any other suitable cross section.

In the example, the profile section 6 bears against the bodywork component 9.

The bodywork component 9 is a bodywork opening having a cutout near its distal edge, to allow the glazing 1 to be mounted in said opening.

More particularly, the bodywork component 9 has a main portion 91 and an end portion 92 (closer to the free edge of the opening than said main portion 91) that is set back toward the inside with respect to said main portion 91 and connected thereto via a shoulder 93.

In the example, the end portion 92 and the shoulder 93 between them form an angle close to a right angle.

The functional part 60 of the profile section 6 bears against the shoulder 93. The portion of the functional part 60 that forms the distal throat 67 of the groove and the bottom of the groove 61 are elastically deformed respectively against the shoulder 93 and against the exterior face of the end portion 92 of the bodywork component. Thus, the functional part 60 collaborates with the bodywork component 9 by having complementing shape, ensuring that said part is held in position and ensuring sealing at the borders of the glazing 1.

The glazed element 2 is fixed by bonding to said end portion 92.

For preference, as illustrated in FIG. 8, the profile section 6 has a height such that, after assembly, the distal exterior edge of the fixing part 60 is in the continuation of the exterior face 91a of the main portion 91 of the bodywork component 9.

FIG. 9 depicts an unassembled view of the glazing according to the embodiment of FIG. 8. This FIG. 9 shows the functional part of the profile section 6 in a non-deformed state. The arrows indicate the way in which deformation is performed.

FIG. 10 is an alternative form of the embodiment of FIG. 8, in which the interlayer flange 71 is provided with a plurality of through-openings 75.

The present invention can be applied to any glazing and in particular to any type of vehicle glazing. It may be applied to any arbitrary edge of this glazing: left, right, top or bottom, and in particular to several of these edges at a time, or even to all of the edges at once.

The invention claimed is:

1. A glazing, comprising a laminated glazed element comprising an exterior glass sheet, an interior glass sheet, and at least one plastic interlayer sheet situated between said exterior and interior glass sheets, said exterior glass sheet having an exterior face, an edge face and an interlayer face which faces toward said plastic interlayer sheet, said interior glass sheet having an interlayer face which faces toward said plastic interlayer sheet, an edge face and an interior face, said glazing comprising, along at least part of at least one edge, a profile section comprising a functional part provided with a groove and a fixing part for fixing the profile section to the glazed element, wherein the fixing part comprises an interlayer flange which, viewed in cross section, is situated between the interlayer face of said exterior glass sheet and the interlayer face of said interior glass sheet, said interlayer flange comprising an exterior face facing toward the exterior glass sheet, an interior face facing toward the interior glass sheet and an edge face, and wherein the interior face or the exterior face of the interlayer flange is, or both the interior face and the exterior face of the interlayer flange are, in contact with said at least one plastic interlayer sheet.

2. The glazing as claimed in claim 1, wherein the exterior face and the edge face of the interlayer flange are in contact with said at least one plastic interlayer sheet and the interior face of the interlayer flange is connected, by contact or via the interposition of a layer of adhesive material, with the interlayer face of the interior glass sheet.

3. The glazing as claimed in claim 1, wherein the glazed element comprises at least one exterior interlayer sheet and one interior interlayer sheet made of plastic between the exterior glass sheet and the interior glass sheet, the exterior face of the interlayer flange being in contact with the exterior interlayer sheet and the interior face of the interlayer flange being in contact with the interior interlayer sheet.

4. The glazing as claimed in claim 3, wherein the glazed element further comprises a third plastic interlayer sheet between the exterior interlayer sheet and the inferior interlayer sheet, the edge face of the interlayer flange being in contact with an edge face of said third interlayer sheet.

5. The glazing as claimed in claim 1, wherein the groove is open toward the exterior.

6. The glazing as claimed in claim 1, wherein the profile section has, in cross section, two recesses that are open in the same direction or in opposite directions, a first recess forming the groove and a second recess fitting over the exterior glass sheet.

7. The glazing as claimed in claim 1, wherein the interlayer flange has a width comprised between 5 and 40 mm.

8. The glazing as claimed in claim 1, wherein the interlayer flange is corrugated.

9. The glazing as claimed in claim 1, wherein the profile section comprises at least one body part made of a thermoplastic material delimiting the groove, and at least one fixing insert provided with a distal part inserted into said body part and with a proximal part that projects out of said body part.

10. The glazing as claimed in claim 9, wherein the interlayer flange is made up at least in part of said proximal part of the fixing insert.

11. The glazing as claimed in claim 1, wherein the interlayer flange has at least one cavity.

12. The glazing as claimed in claim 1, wherein the profile section is provided with a sealing lip between the groove and the interlayer flange.

13. The glazing as claimed in claim 1, wherein the groove is configured for clip-fastening a cover piece onto said profile section.

14. An assembly, comprising
a glazing as claimed in claim 1, wherein the groove is configured for the clip-fastening of a cover piece onto said profile section, and
a cover piece comprising, viewed in cross section, a barbed hook that enters said groove during clip-fastening.

15. The assembly as claimed in claim 14, wherein the cover piece is a scuttle panel or a trim element.

16. An assembly comprising
a glazing as claimed in claim 1, and
a bodywork component,
the profile section bearing against said bodywork component.

17. The assembly as claimed in claim 16, wherein the bodywork component has a main portion and an end portion that is set back toward the interior with respect to said main portion and connected thereto by a shoulder, and the functional part of the profile section bears against the shoulder, and the glazed element is fixed by bonding to said end portion.

18. A profile section for a glazing as claimed in claim 1, comprising at least one body part made of a thermoplastic material delimiting a groove, and at least one fixing insert provided with a distal part inserted into said body part and with a proximal part that projects out of said body part.

19. The profile section as claimed in claim 18, wherein the proximal part of the fixing insert has a plurality of through-openings.

20. A method for producing a glazing as claimed in claim 1, comprising a step of laminating the exterior glass sheet and the interior glass sheet of the glazed element using at least one plastic interlayer sheet, the lamination step involving placing the interlayer flange of the profile section between the exterior glass sheet and the interior glass sheet in contact with said at least one interlayer sheet.

* * * * *